United States Patent [19]
Nakashima et al.

[11] Patent Number: 5,850,887
[45] Date of Patent: *Dec. 22, 1998

[54] ACCELERATION SLIP CONTROL SYSTEM FOR MOTOR VEHICLE

[75] Inventors: Seiichi Nakashima, Susono; Kenji Sasahara, Gotenba, both of Japan

[73] Assignee: Toyota Jidosha Kabushiki Kaisha, Toyota, Japan

[*] Notice: This patent issued on a continued prosecution application filed under 37 CFR 1.53(d), and is subject to the twenty year patent term provisions of 35 U.S.C. 154(a)(2).

[21] Appl. No.: 762,431

[22] Filed: Dec. 9, 1996

[30] Foreign Application Priority Data

Dec. 21, 1995 [JP] Japan .................................. 7-333112

[51] Int. Cl.⁶ ............................. B60T 8/32; B60T 8/24; B60K 27/02
[52] U.S. Cl. .......................... 180/197; 303/139; 303/141; 303/142; 303/177; 477/120; 701/90; 701/87
[58] Field of Search ........................ 180/197; 303/139, 303/141, 142, 121, 148, 145, 3, 177, 150; 477/40, 904, 905, 120; 364/426.029, 426.033, 426.036, 426.037; 188/181 A

[56] References Cited

U.S. PATENT DOCUMENTS 5,262,952  11/1993  Tsuyama et al. ................. 364/426.033
5,383,125  1/1995   Hibi ......................................... 180/197
5,741,051  4/1998   Nakashima ............................... 180/197

FOREIGN PATENT DOCUMENTS

A-4-92729  3/1992  Japan .

*Primary Examiner*—Douglas C. Butler
*Attorney, Agent, or Firm*—Oliff & Berridge, PLC

[57] ABSTRACT

An acceleration slip control system for a motor vehicle operates so that a request for the upshift of the transmission of the motor vehicle is not output to upshift device in accordance with a road surface condition detected by road-surface condition detection device, on the basis of the detection results of engine revolution-speed detection device and driving-wheel slip detection device, whereby the inferior acceleration of the motor vehicle attributed to the upshift is prevented in order to perform the optimum gear-shift control conforming to the road surface condition.

10 Claims, 4 Drawing Sheets

ACCELERATION SLIP CONTROL SYSTEM FOR MOTOR VEHICLE

BACKGROUND OF THE INVENTION

1. Field of the Invention

The present invention relates to an acceleration slip control system for a motor vehicle.

2. Description of the Prior Art

There has heretofore been proposed an acceleration slip control system wherein, when the driving wheel of a motor vehicle has slipped during the acceleration thereof, the slip is prevented by braking so as to enhance the starting stability and accelerating quality of the motor vehicle.

There has also been proposed an acceleration slip control system wherein fuel feed to the engine of a motor vehicle is cut separately from or jointly with a braking control so as to lower the output power itself of the engine.

Further, the official gazette of Japanese Patent Application Laid-open No. 92729/1992, for example, discloses a technique for preventing deterioration in the performance of a catalyst. In the technique, the gear stage of an automatic transmission is upshifted to the higher gear stage side thereof in a case where the revolution speed of the engine of a motor vehicle has been greater than a predetermined value under the condition under which a command for cutting fuel feed to a specified one of the cylinders of the engine is issued because a slip factor exceeds a predetermined value.

This technique is intended to cope with the following phenomenon: In the high revolution speed zone of the engine, the power increase and OTP increase (Over-Temperature correction) of fuel are carried out. Therefore, the unburnt fuel is emitted from the cylinder to which the fuel feed is not cut, whereas intake air containing oxygen is directly emitted as exhaust air of high temperature from the cylinder to which the fuel feed is cut. In consequence, the unburnt fuel and the oxygen are mixed and burnt within the catalyst, and the temperature of the catalyst rises due to the burning.

In some cases, however, when the motor vehicle passes on a difference in road level, a warning line in white, an iron plate, or the like during the acceleration thereof on a road surface of high friction coefficient (high $\mu$), for example, an asphalt road surface, a slip arises for only a very short time, so that the drive of the motor vehicle enters an acceleration slip control (a traction control abbreviated to "TRC").

On this occasion, with the prior-art technique, the gear stage is upshifted notwithstanding the engine revolution speed is low. This results in the problem that the acceleration worsens. Moreover, a torque ratio in the automatic transmission enlarges, and kinetic energy is converted into thermal energy within the automatic transmission. An overload is therefore apprehended when the automatic transmission has a small torque capacity.

SUMMARY OF THE INVENTION

The present invention has been made in order to solve the problems of the prior art as stated above, and has for its object to provide an acceleration slip control system for a motor vehicle in which the inferior acceleration or the overload, etc. ascribable to the upshift of the transmission of the motor vehicle are prevented to realize the optimum gear-shift control conforming to a road surface condition.

In one aspect, the invention comprises means for detecting a road surface condition and means for limiting upshifting of the transmission based on the road surface condition.

In another aspect, the invention comprises means for detecting a road surface condition and means for altering a gear-shift revolution speed for effecting upshifting of the transmission, based on the road surface condition.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein.

DETAILED DESCRIPTION OF THE PREFERRED EMBODIMENTS

Now, examples of the practicable aspects of performance of the present invention will be described in detail with reference to the drawings.

Figure 1A:
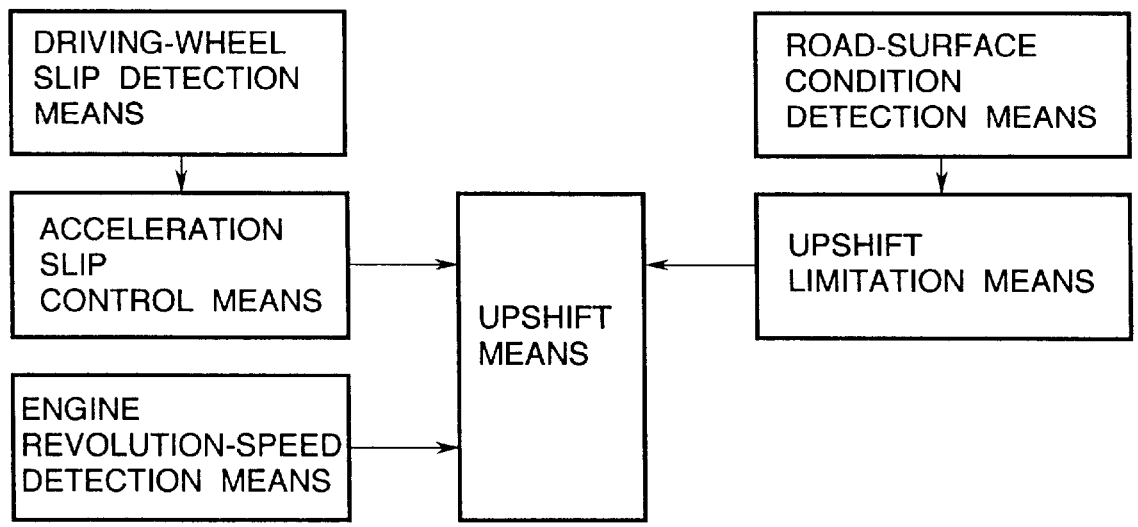
FIGS. 1A and 1B are conceptional block diagrams each showing the gist of the present invention.
Figure 1B:
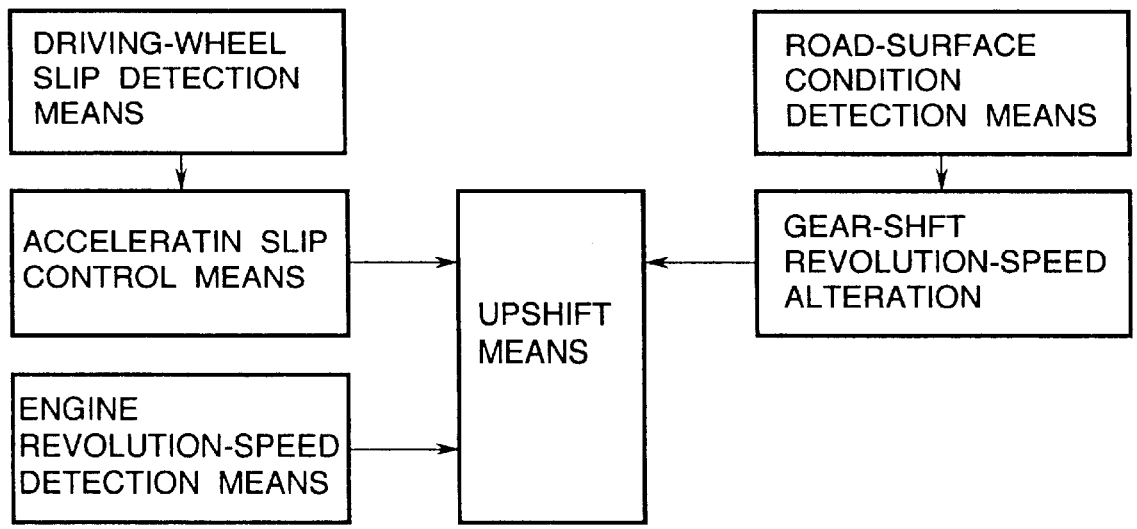
Figure 2:
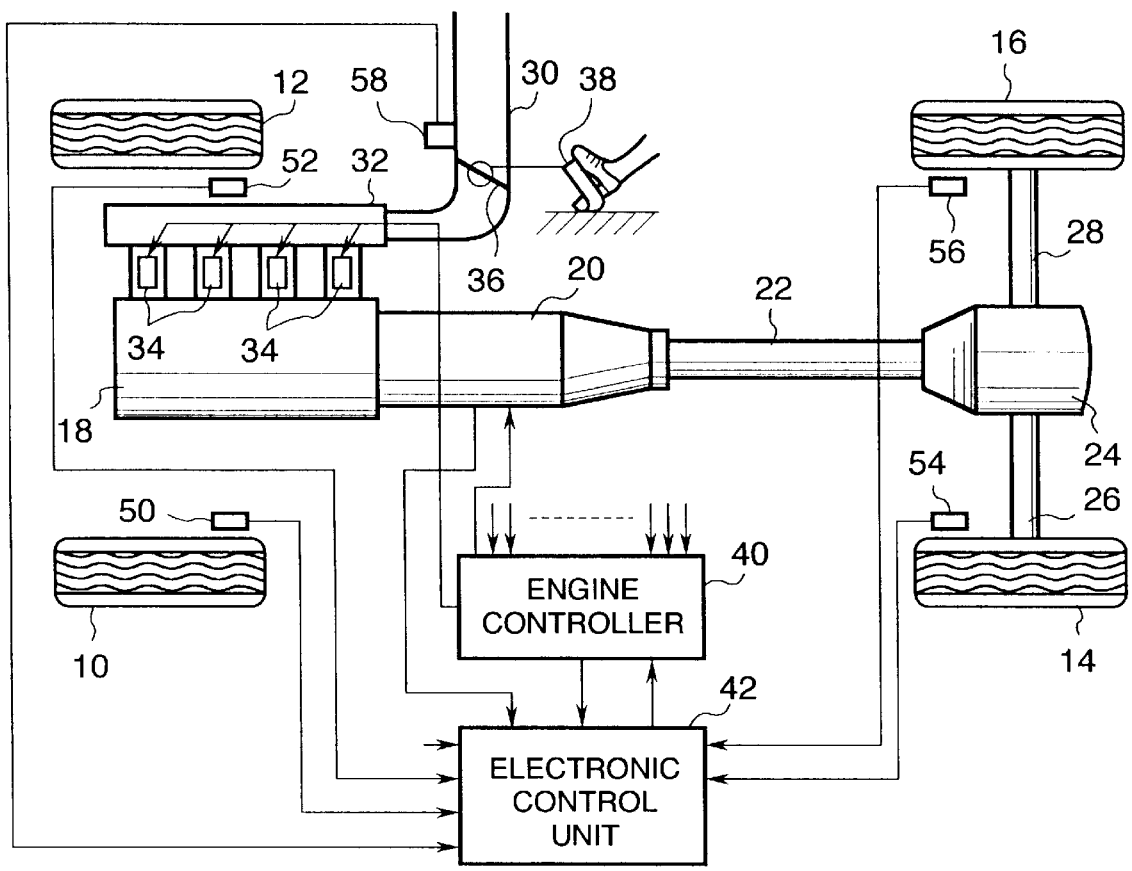
FIG. 2 is a schematic constructional view of a motor vehicle which is furnished with an acceleration slip control system according to the first aspect of performance of the present invention.

FIG. 2 is a schematic constructional view of a motor vehicle which is furnished with an acceleration slip control system according to the first aspect of performance of the present invention.

Referring to FIG. 2, numerals 10 and 12 designate left and right front wheels as driven wheels, and numerals 14 and 16 left and right rear wheels as driving wheels, respectively. The output torque of an engine 18 is transmitted to the left and right rear wheels 14 and 16 via transmission gears 20, a propeller shaft 22, differential gears 24, and left and right driving axles 26 and 28, respectively.

A throttle valve 36 for controlling the quantity of intake air is incorporated in the intake passage 30 of the engine 18. The throttle valve 36 is joined with an accelerator pedal 38, and is opened or closed in accordance with the pressed magnitude of the accelerator pedal 38.

Each of fuel injection valves 34 has its valve opening timing and its valve opening duration controlled by control signals delivered from an engine controller 40, thereby to inject and feed the engine 18 with fuel in a quantity corresponding to the valve opening duration. The fuel injection quantity is controlled by the engine controller 40 in accordance with that quantity of intake air per cycle of the engine which is basically determined by the quantity of intake air or the internal pressure of an intake pipe, and an engine revolution speed (engine r. p. m.) NE.

An electronic control unit 42 is an ordinary one including a microcomputer. The unit 42 accepts the revolution numbers of the left and right front wheels 10 and 12 as the speeds of these driven wheels from left and right driven-wheel speed sensors 50 and 52, respectively. Likewise, the unit 42 accepts the revolution numbers of the left and right rear wheels 14 and 16 as the speeds of these driving wheels from left and right driving-wheel speed sensors 54 and 56, respectively. The unit 42 also accepts information on a gear shift position from the transmission gears (automatic transmission) 20, information on the degree of opening of the throttle valve 36 from a throttle opening sensor 58, and information on the revolution speed NE of the engine 18 calculated by the engine controller 40. Using the accepted information items, the unit 42 discriminates whether or not an acceleration slip has occurred.

In addition, the electronic control unit 42 calculates wheel accelerations from the accepted wheel speeds, and combines them with the different information (for example, the degree of opening of the throttle valve 36), thereby to detect (or estimate) the condition of a road surface (or the friction coefficient $\mu$ thereof) in conformity with a known method. Further, it detects (or estimates) whether or not the road surface condition corresponds to a so-called "bad road", on the basis of the fluctuating states of the wheel speeds.

Meanwhile, the engine controller 40 gives the transmission gears 20 a request command for limiting (regulating) upshift (or for altering a gear-shift revolution-speed for upshift in the second aspect of performance).

Now, the operation of the first aspect of performance will be explained in conjunction with a flow chart illustrated in FIG. 3.

Figure 3:
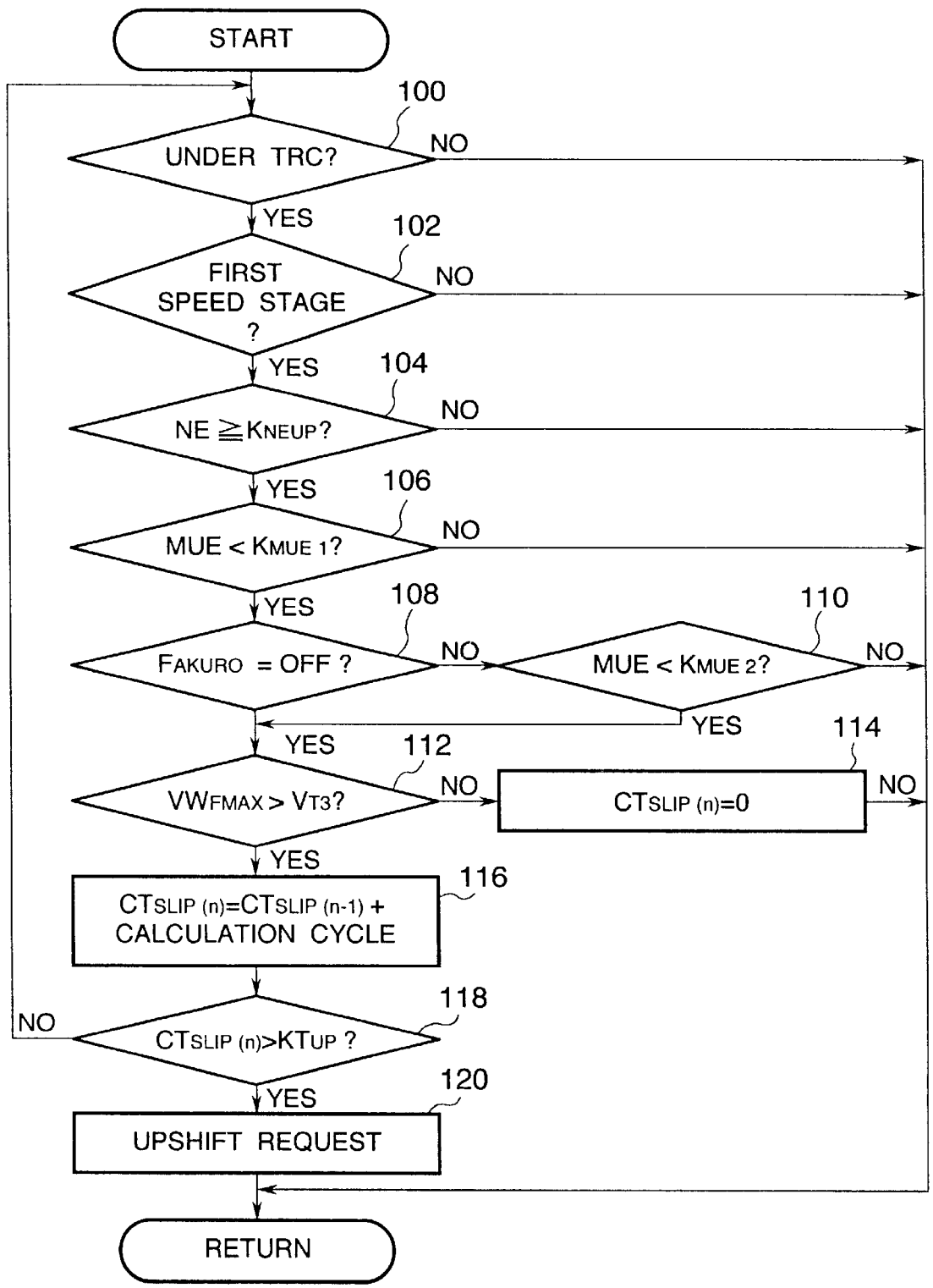
FIG. 3 is a flow chart showing an upshift request deciding process according to the first aspect of performance.

At a step 100 in FIG. 3, whether or not the motor vehicle is under a TRC (traction control) is decided (or judged). In a case where the TRC is not proceeding, the control flow of FIG. 3 is immediately exited from, and the usual mode of an automatic transmission control is performed. On the other hand, in a case where the TRC is proceeding, whether or not the current position of the automatic transmission (20 in FIG. 2) is the first speed (low gear) stage is decided at the next step 102. At or above the second speed (second gear) stage, since the driving force of the motor vehicle is small, the is control flow is returned without daring to make a request for the upshift.

In a case where the current shift position is the first speed stage, whether or not the engine revolution speed NE is greater than or equal to a revolution speed $K_{neup}$ for a gear shift from the first speed stage to the second speed stage in the TRC mode is decided at the next step 104. When the speed NE is not greater than or equal to the speed $K_{kneup}$ as the result of the decision, the control flow is returned without making the upshift request, and when the former speed NE is greater than or equal to the latter speed $K_{neup}$, the control flow is advanced to the next step 106.

The step 106 serves to decide whether or not the estimative value of the friction coefficient $\mu$ of the road surface as calculated from an estimative vehicle acceleration etc. in the TRC mode (that is, the estimation value MUE of the road-surface-$\mu$) is smaller than a threshold value $K_{me1}$. When the road-surface-$\mu$ estimation value MUE is not smaller than the threshold value $K_{meu1}$, the control flow is returned, and when the former value MUE is smaller than the latter value $K_{mue1}$, whether or not the condition of the road surface is a bad road condition is decided at the next step 108.

The bad road condition is judged by any known method on the basis of, for example, the fluctuations of the wheel accelerations. Subject to the bad road condition, a bad road flag $F_{akuro}$ is turned ON. In a case where the bad road flag $F_{akuro}$ is ON at the step 108, the road-surface-$\mu$ estimation value MUE is compared again with another threshold value $K_{mue2}$ at a step 110. Here, the threshold values are held at $K_{mue2} < K_{mue1}$.

When the road-surface-$\mu$ estimation value MUE is not smaller than the threshold value $K_{mue2}$, the control flow is returned, and when the former MUE is smaller than the latter value $K_{mue2}$, the control flow is advanced to the next step 112. This is based on the contrivance that, even in the bad road condition, the upshift request is made in the case where the road-surface-$\mu$ is small.

The step 112 serves to decide whether or not the slip of the driving wheel (14 or 16 in FIG. 2) has converged. The decision is rendered depending upon whether or not a higher one VW $_{fmax}$ of the speeds of the left and right driving wheels is greater than a target (or target) controlled vehicle speed $V_{t3}$, that is, whether or not the following inequality (1) is held:

$$VW_{fmax} > V_{T3} \qquad (1)$$

In a case where the inequality (1) is held, since the driving-wheel slip has not converged yet, a counter CTSLIP (n) for a slip time is incremented in correspondence with a calculation cycle at a step 116, which is followed by a step 118. On the other hand, in a case where the inequality (1) is not held, the driving-wheel slip has already converged. Therefore, the slip time counter CT$_{slip}$(n) is cleared to zero at a step 114, whereupon the control flow is returned.

At the step 118, the slip time counter CT$_{slip}$(n) is compared with the threshold value KT$_{up}$ of the slip time. In a case where the slip time counter CT$_{slip}$(n) is greater than the threshold value KT$_{up}$, namely the driving-wheel slip does not converge within the time period of the threshold value KT$_{up}$, it is judged that the road surface corresponds to a so-called "low-$\mu$ road" or, the road-surface friction coefficient $\mu$ is small. Then, the upshift request is made at the next step 120. On the other hand, in a case where the driving-wheel slip converges within the time period of the threshold value KT$_{up}$, it is judged that the driving wheel has happened to slip on a difference in road level, a warning line in white, an iron plate, or the like although the road surface corresponds to a so-called "high-$\mu$ road", or, the road-surface friction coefficient $\mu$ is great. Then, the control flow is brought back to the step 100 without making the upshift request.

As thus far explained, according to this aspect of performance, the upshift request is made in compliance with not only the condition that the engine revolution speed is greater than the predetermined speed, but also the conditions of: the converging time period of the driving-wheel slip during the execution of the TRC; the road surface, such as the bad or good road; and the road surface $\mu$. It is therefore possible to prevent the inferior acceleration of the motor vehicle attributed to the unnecessary upshift.

Next, the second aspect of performance of the present invention will be explained.

As stated above, the first aspect of performance consists in deciding the propriety of the upshift request on the basis of the road surface condition, and quite inhibiting the upshift under some road surface conditions. In contrast, the second aspect of performance consists in altering the gear-shift revolution speed for effecting the upshift, on the basis of the road surface condition.

Figure 4:
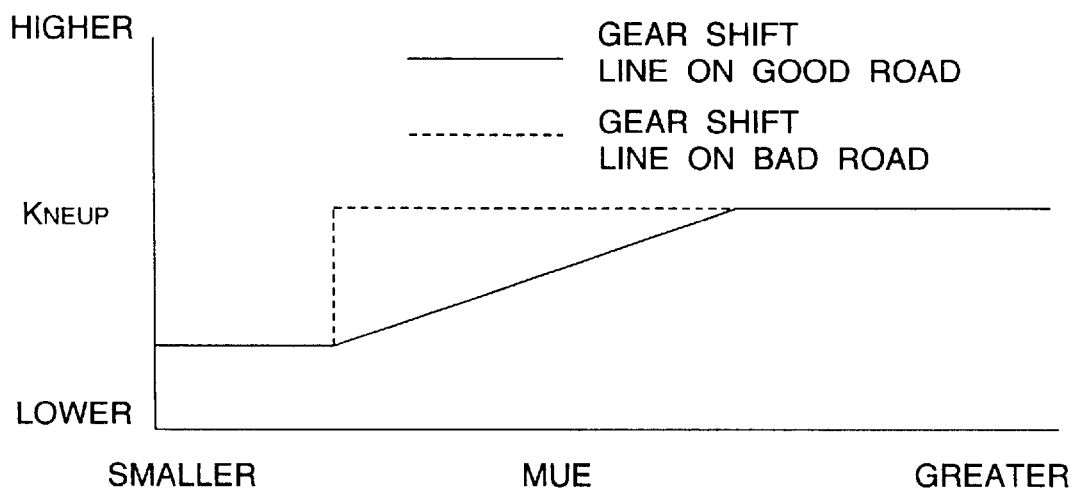
FIG. 4 is a graph showing the alteration of a gear-shift revolution speed according to the second aspect of performance.

FIG. 4 illustrates the relationship between the road-surface-$\mu$ estimation value MUE and the engine revolution speed for the upshift (i. e., the gear-shift revolution speed) $K_{neup}$.

In the graph of FIG. 4, a solid line represents a gear shift line (line of the gear-shift revolution speed) on the good road, while a broken line represents a gear shift line on the bad road.

As seen from the graph, in the case where the road-surface-$\mu$ is high, or where the drive road of the motor vehicle is bad, the gear-shift revolution speed $K_{neup}$ is heightened to make the upshift difficult, whereby the inferior acceleration is suppressed. On the other hand, in the case where the road-surface-$\mu$ is low, the gearshift revolution speed $K_{neup}$ is lowered to make the upshift easy, whereby the controllability of the TRC or the durability of a catalyst mounted on the motor vehicle is enhanced.

According to this aspect of performance, the engine revolution speed for effecting the upshift is altered depending upon the road surface condition, so that the optimum gear-shift control conforming to the road surface condition can be realized.

Incidentally, it is to be understood that the hardware architecture of the second aspect of performance may be identical to the construction shown in FIG. 2.

As described above, according to these aspects of performance, the converging time period of the driving-wheel slip and the road surface conditions etc. are considered in response to the judgements of the upshift requests. Thus, it is permitted to prevent the inferior acceleration of the motor vehicle and the overload of the automatic transmission which are attributed to the upshift effected especially in the low revolution speed zone of the engine in a wide open throttle state.

As set forth above, according to the present invention, even when the revolution speed of an engine is predetermined speed or above, upshift is limited or regulated in case of a bad drive road or a low-$\mu$ drive road, whereby an inferior acceleration ascribable to the upshift can be prevented, and besides, a gear-shift revolution speed for effecting the upshift is altered depending upon a road surface condition, so that the optimum gear-shift control conforming to the road surface condition can be realized.

What is claimed is:

1. An acceleration slip control system for a motor vehicle wherein an acceleration slip control is executed when a slip of a driving wheel has been detected, and wherein a transmission is upshifted when an engine revolution speed is greater than a predetermined speed, comprising:

means for detecting a road surface condition after the slip of a driving wheel has been detected; and means for limiting upshift of the transmission, after the acceleration slip control is executed based on the road surface condition detected after the slip of the driving wheel has been detected.

2. An acceleration slip control system for a motor vehicle as defined in claim 1, wherein said means for detecting a road surface condition detects a road-surface friction coefficient.

3. The acceleration slip control system of claim 2, wherein the limiting means prevents upshift when the detected road-surface friction coefficient is greater than a predetermined value.

4. An acceleration slip control system for a motor vehicle as defined in claim 1, wherein said means for detecting a road surface condition detects whether the road on which said motor vehicle drives is a bad road or not.

5. The acceleration slip control system of claim 1, wherein the limiting means prevents upshift when a duration of the detected slip of the driving wheel is less than a predetermined time period.

6. An acceleration slip control system for a motor vehicle wherein an acceleration slip control is executed when a slip of a driving wheel has been detected, and wherein a transmission is upshifted when an engine revolution speed is greater than a predetermined speed, comprising:

means for detecting a road surface condition after the slip of a driving wheel has been detected; and means for altering a gear-shift revolution speed for effecting upshift of the transmission after the acceleration slip control is executed based on the road surface condition detected after the slip of the driving wheel has been detected.

7. An acceleration slip control system for a motor vehicle as defined in claim 6, wherein said means for detecting a road surface condition detects a road-surface friction coefficient.

8. The acceleration slip control system of claim 7, wherein the altering means increases the gear-shift revolution speed for effecting upshift when the detected road-surface friction coefficient is greater than a predetermined value.

9. An acceleration slip control system for motor vehicle as defined in claim 6, wherein said means for detecting a road surface condition detects whether the road on which said motor vehicle drives is a bad road or not.

10. The acceleration slip control system of claim herein the altering means increases the gear-shift revolution speed for effecting upshift when a duration of the detected slip of the driving wheel is less than a predetermined time period.

* * * * *